INVENTOR
WILLIAM S. HALSTEAD
BY Herbert J. Smith
ATTORNEY

INVENTOR
WILLIAM S. HALSTEAD
BY Herbert H. Arnold
ATTORNEY

INVENTOR
WILLIAM S. HALSTEAD
BY Herbert [signature]
ATTORNEY

INVENTOR
WILLIAM S. HALSTEAD
BY Herbert Smith
ATTORNEY

MULTIPLEX COMMUNICATIONS SYSTEM

INVENTOR
WILLIAM S. HALSTEAD
BY Herbert J. Smith
ATTORNEY

H.P. FILTER RESPONSE

DISCRIMINATOR RESPONSE

COMPOSITE OF H.P. FILTER & DISCRIMINATOR RESPONSE

INVENTOR
WILLIAM S. HALSTEAD
BY [signature]
ATTORNEY

MULTIPLEX COMMUNICATIONS SYSTEM

Filed July 31, 1950 7 Sheets-Sheet 7

INVENTOR
WILLIAM S. HALSTEAD
BY Herbert ~~Smith~~
ATTORNEY 2,697,745

MULTIPLEX COMMUNICATIONS SYSTEM

William S. Halstead, Mount Kisco, N. Y., assignor to Multiplex Development Corporation, New York County, N. Y.

Application July 31, 1950, Serial No. 176,787

8 Claims. (Cl. 178—5.8)

This invention relates to multiplex broadcasting or communications systems, and more particularly pertains to a multiplex system adapted to transmit facsimile or other intelligence signals simultaneously with the main channel signals of a conventional frequency modulation (FM) broadcast, television, or other FM transmitter without causing mutual interference between the two types of signals in standard FM broadcast receiving equipment of the nature now in general use by the public.

The invention is particularly applicable in the field of FM broadcast network operation wherein, by the multiplex system of the invention, a master facsimile transmitter, for example, at a central control point may effect reliable control of operation of a number of remote facsimile recorders or engravers connected to FM radio receivers and located in newspaper or other offices in different cities throughout an entire State or nation, without causing interference with simultaneous transmission of high-fidelity aural programs on the main channels of the various FM broadcast stations of a State-wide or national radio-relay network.

Prior to the development of the system of the invention, facsimile multiplex systems adaptable to the relatively high transmission speeds established as standard for facsimile broadcasting by the Federal Communications Commission (FCC) required a sacrifice of the upper portion of the audio frequency range of the main, or aural program, channel of conventional FM broadcast transmitters. An upper frequency limit of about 10,000 cycles in lieu of the normal 15,000 cycles was established for the aural program channel in the Rules and Regulations of the FCC, relating to experimental facsimile multiplex transmission by FM broadcast stations. Results obtained in the field, however, indicated that even with this restriction in the audio-frequency range some interference was produced by addition of a multiplex facsimile channel to the transmission of an FM broadcast station when conventional FM broadcast receivers of certain types were employed. In many cases, the facsimile multiplex signals would cause interference or noise in the aural program channel at these receivers, which, under Rules and Regulations of the FCC pertaining to facsimile multiplex should not require special filters or other devices to eliminate the interfering multiplex signals. It was reported, for example, that FM broadcast receivers having ratio detectors or improperly adusted FM discriminators were particularly susceptible to undesired intrusion of the facsimile multiplex signals within the audio frequency range between 30 and 10,000 cycles. For this reason, and until it could be demonstrated that no interference would be caused by the use of multiplex methods, the FCC required that facsimile multiplex experimental transmissions be conducted during limited periods not in excess of three hours per day. The Commission recommended to the radio industry that attention be given to the development of facsimile multiplex systems that would cause no interference with or degradation of high-fidelity aural program transmission and reception within the full range 30–15,000 cycles, and which would require no special filters or additional equipment of any type on conventional broadcast receivers in the hands of the public in order to achieve full unimpaired reception of high-fidelity aural programs.

The system of the present invention meets the objectives of the FCC in every respect; the full high-fidelity characteristics of aural program transmission and reception within the range 30–15,000 cycles are retained during multiplex operation, no interference whatever is produced by the multiplex system of the invention within the aural program channel extending to 15,000 cycles and no special filters or other devices are required on any type of FM receiver; the level of the facsimile multiplex signal within the audio frequency range to 15,000 cycles is approximately 70–80 db below an average program level (6 milliwatts, at 500 ohms, as program reference level); and extensive tests of the system as applied to radio-relay FM broadcasting networks have demonstrated that the facsimile multiplex signals may be superimposed on the main carrier of each FM broadcast station in a network chain simultaneously with radio-relay or local transmission of aural programs, with no undesirable effects whatever being introduced at the relay stations by the addition of the multiplex signals.

Among the advantages of the present invention are the following:

(1) The present multiplex system is applicable to standard FM broadcast transmitters and conventional FM broadcast receivers now in general public use.

(2) The system will cause no interference with or degradation of high-fidelity aural program transmissions in the range of 30–15,000 cycles.

(3) The multiplex system is adaptable to existing facsimile or other graphic intelligence communications equipment of standard type, and will permit the use of this equipment in association with conventional FM broadcast transmitters and receivers, or other suitable radio transmitting and receiving apparatus.

(4) The system will permit the use of standard amplitude modulated facsimile scanning and recording equipment having 5 kc. or 10 kc. subcarriers.

(5) The system may be employed in association with standard wire photo or facsimile transmitting equipment disposed at a remote point and connected to the radio transmitting station by means of a telephone line.

(6) The system is adaptable to existing FM broadcast networks or other radio-relay systems in which a plurality of FM transmitting and receiving equipments in progressive relay interconnection are utilized.

(7) The system is especially adaptable to radio-relay operations wherein relay transmission of the multiplex signals at each relay station may be accomplished with a mimimum of monitoring or signal-level adjustments.

(8) The system provides a "drop" or monitor circuit at each relay station whereby the multiplex signals may be employed for recording or other operational purposes at the relay station without interfering with the "straight-through" relay transmission of the multiplex subcarrier, which may be relayed without demodulation.

(9) The system will provide a constant amplitude facsimile subcarrier which may readily be maintained at a given level throughout the relay chain of FM broadcast stations, thereby establishing a long distance communications channel of sufficient stability and reliability to permit radio control of engraving machines employed in forming newspaper cuts, and the like, at a multiplicity of radio receiving points.

Other advantages will be evident from the following description considered in connection with the drawings.

Referring to the drawings in which a presently preferred embodiment of the system of the invention is illustrated:

Figure 7:
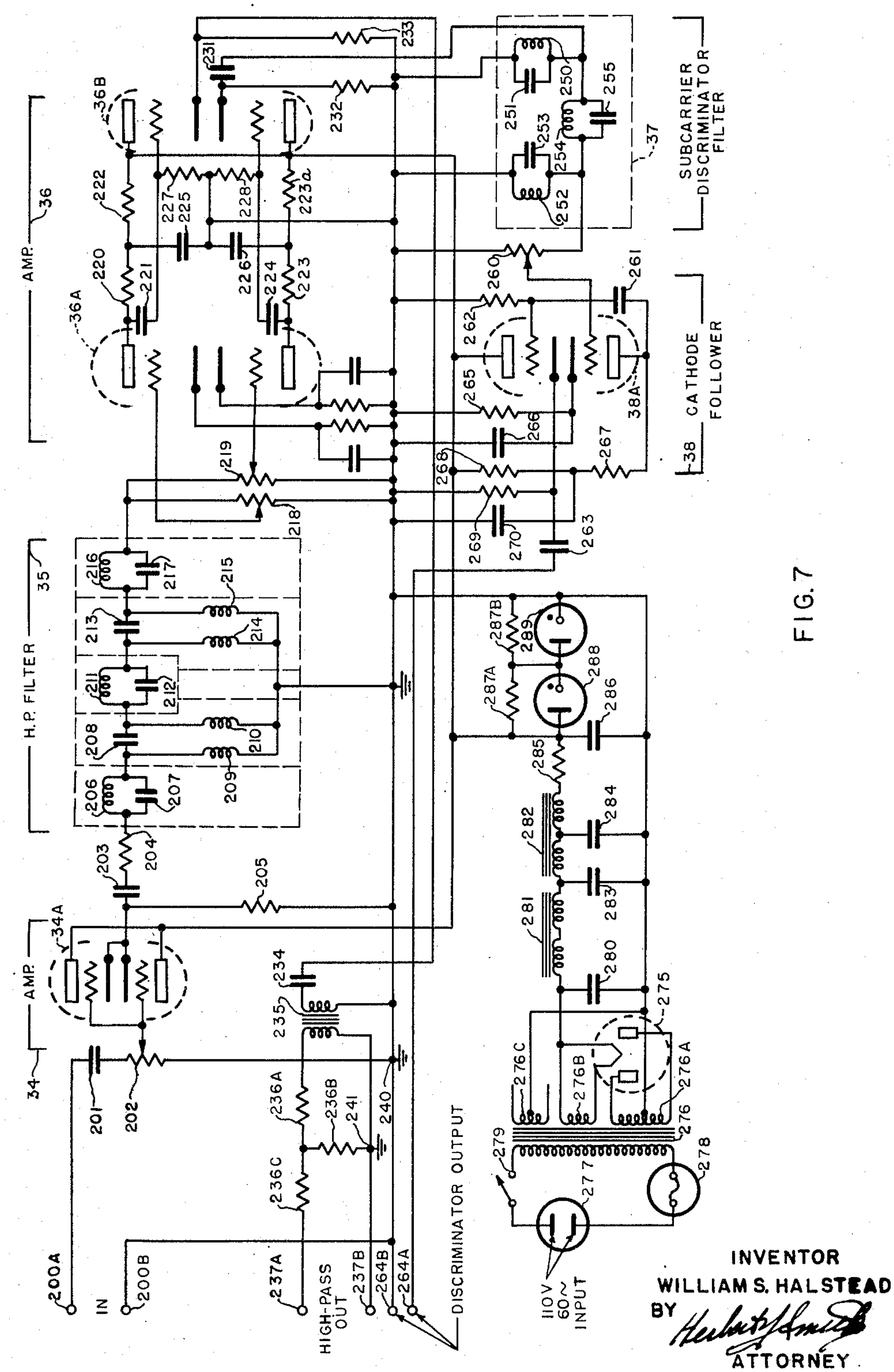

Fig. 7 is a circuit diagram of an illustrative arrangement of facsimile multiplex receiving equipment, attachable between an FM broadcast relay receiver and a conventional form of facsimile recording equipment to provide a "drop" or monitor circuit at a relay station, together with a multiplex relay channel to permit radio-relay transmission of multiplex facsimile signals without demodulation of the facsimile multiplex subcarrier.

Figure 8:
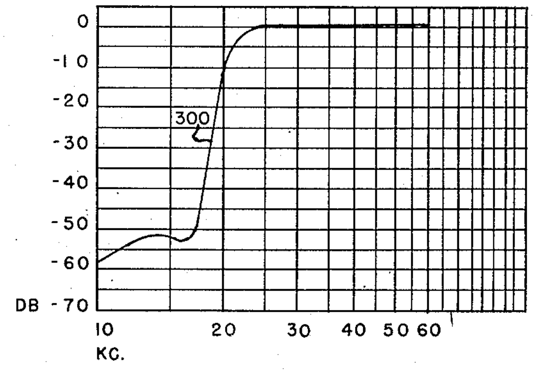

Fig. 8 is an illustrative response curve of one form of high-pass filter employed as a part of the facsimile multiplex receiving and relaying circuit shown in Fig. 7.

Figure 9:
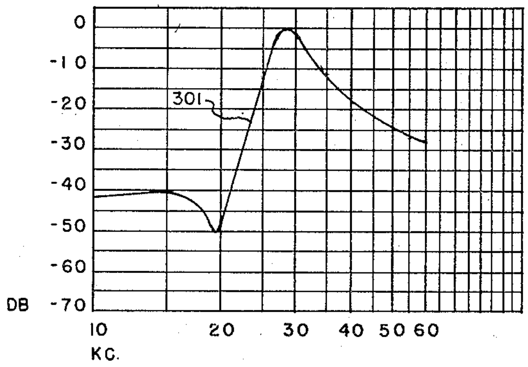

Fig. 9 is an illustrative response curve of one form of subcarrier discriminator employed in the "drop" or monitor circuit of facsimile multiplex receiving and relay circuit of Fig. 7.

Figure 10:
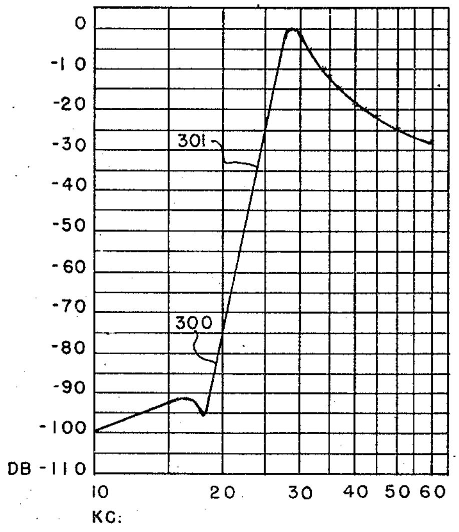

Fig. 10 is a composite of the high-pass filter and subcarrier discriminator response curves shown in Figs. 8 and 9.

Figures 11, 12:
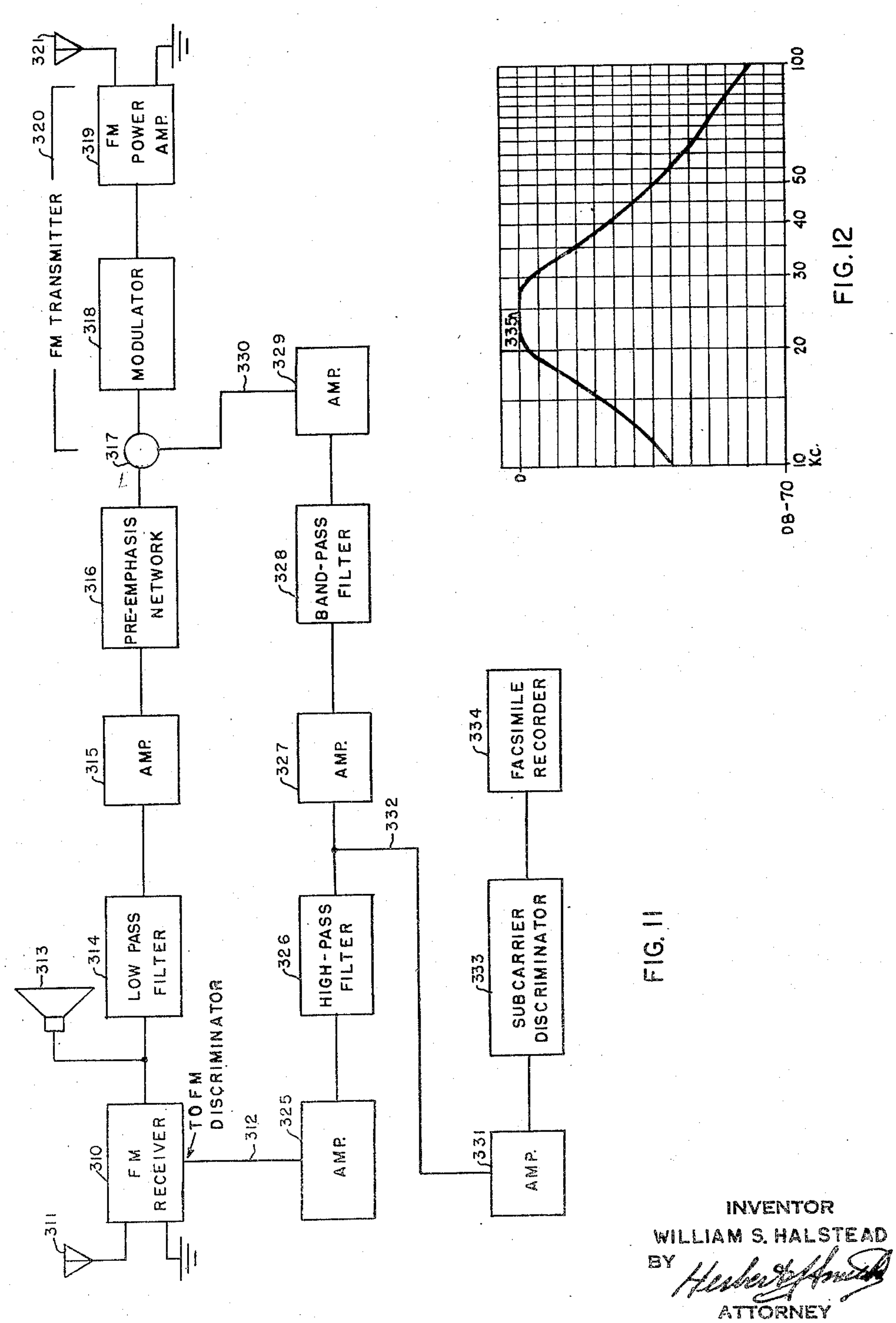

Fig. 11 is an illustrative block diagram of a complete facsimile multiplex relaying arrangement, including means for radio relay transmission of high-fidelity aural program signals, and a "drop" or monitor circuit for local facsimile recording at the radio relay station.

Fig. 12 is a representative response curve of a band-pass filter employed in the facsimile multiplex relay channel of Fig. 11.

Figure 1:
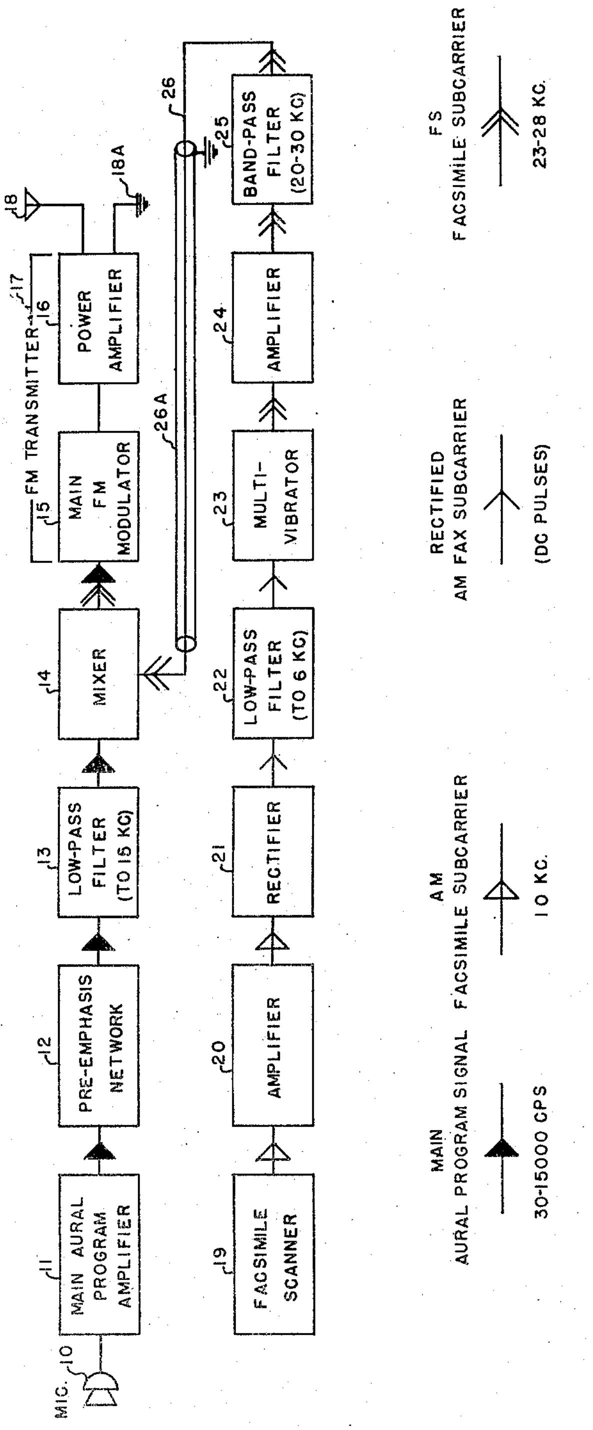
Fig. 1 is a block diagram of multiplex transmitting equipment arranged in accordance with the system of the invention as connected to a conventional FM broadcast transmitter to permit simultaneous transmission of facsimile multiplex signals and high-fidelity aural programs, the latter within the audio-frequency range up to 15,000 cycles, without impairing the quality of the aural program signals.

Referring to Fig. 1 block arrangement, a microphone 10, or other aural program pick-up means is connected through the main aural program amplifier 11 of an FM broadcast station to a standard pre-emphasis network 12 of any suitable well-known type as customarily employed in FM broadcast stations. The aural program signals, within the range 30–15,000 cycles per second, are then passed through a low-pass filter 13, effective in passing audio signal energy within the aural program range to 15,000 cycles and operable in restricting passage of undesired aural program signal energy above 15,000 cycles, such as unwanted harmonics of speech or music beyond the limit of normal audibility. The aural program signals, after passage through filter 13 are applied to an input circuit of mixer or coupling unit 14, of any suitable well-known type, and having as its purpose the combining of two input circuits or channels into a single output circuit or channel without disturbing the optimum impedance relationships of either input circuit or the common output circuit as the gain of either input channel may be varied. The output circuit of mixer 14 is connected to the signal input of the main modulator 15 of FM broadcast transmitter 17, of which power amplifier 16 is the output stage. Radio frequency energy is then applied to antenna 18 and ground 18A, in conventional manner. The program amplifier 11 includes the usual volume control which is associated with conventional broadcast program amplifiers and which determines by its setting the amplitude of the audio output signal of amplifier 11 and consequent depth of modulation of the main carrier of transmitter 17.

A facsimile scanner 19, of any suitable well-known type, which in this illustrative arrangement may be a standard facsimile broadcast scanner having an amplitude-modulated subcarrier of 10 kilocycles, is connected to an audio amplifier 20, thence to facsimile signal rectifier 21, in which the 10 kilocycle audio frequency subcarrier is rectified, with the variations in amplitude of the subcarrier appearing at the output of the rectifier as D. C. pulses of varying amplitude. A low-pass filter 22 is employed to remove any trace of the original 10 kilocycle facsimile subcarrier, undesired harmonics or modulating components above about 6 kilocycles. The D. C. pulses are then applied to the input circuit of a free-running multivibrator 23, adjusted to produce an output frequency in the inaudible subcarrier range between 23 and 28 kilocycles, for example, as the D. C. input voltage is varied between minimum and maximum, corresponding to "white" and "black" signals of the facsimile scanner when negative modulation is employed in the scanning equipment. This relatively small deviation is important in providing most effective use of the channel space available between the aural program signal range (50–15,000 cycles) and the upper frequency limit, established by the modulator unit of the usual frequency-modulation broadcast transmitter.

The multivibrator 23 is designed to provide substantially constant output voltage as the output frequency of the multivibrator circuit is swung over the range between 23 and 28 kilocycles, or other predetermined operational range. The constant-amplitude variable-frequency, or frequency-shift, subcarrier within the inaudible range between 23 and 28 kilocycles is applied to the input circuit of a band-pass filter 25, having a substantially flat frequency response within the range 23–28 kilocycles, with rapid attenuation of signal energy above and below this pass band. This filter attenuates undesired harmonics or other modulating components above about 30 kilocycles. Inasmuch as the band-pass filter 25 has a substantially uniform response within the band 23–28 through which the frequency-shift (FS) subcarrier is swung during facsimile transmission, the subcarrier level is kept substantially constant, without introduction of amplitude modulation which could result if the pass band were not sufficiently broad as well as substantially uniform in response, as will be explained in further detail in subsequent paragraphs. The constant-amplitude FS subcarrier is then applied through shielded conductor 26 to an input circuit of mixer 14, employed in feeding the aural program signals and the facsimile subcarrier signals to the common signal input circuit of the main modulator 15 of the radio transmitter 17. The main modulator unit 15 is designed, modified or adjusted to provide substantially uniform response within the facsimile subcarrier range of 23–28 kilocycles.

In operation, the signal level of the constant-amplitude FS subcarrier is adjusted to provide about 10% modulation of the main FM carrier as emitted by the power amplifier 16 of the broadcast transmitter 17 (Fig. 1). The aural program signal level is then limited by the operator to keep program signal peaks within a predetermined maximum total modulation depth, and hence of a total frequency deviation of the main carrier established by Government regulation as a modulation or frequency deviation reference level of 100%. That is, with the constant-level facsimile subcarrier effecting a base modulation of 10%, the aural program signal level is reduced slightly, viz., by substantially the same amount, to allow for the frequency deviation of the subcarrier signal in order that the combined aural program and facsimile multiplexed signals will not cause more than the abovementioned 100% modulation, or frequency deviation, of the main carrier of the transmitter on program signal peaks.

With the circuits as described above, a substantially flat over-all frequency response is provided for the multiplex subcarrier throughout the range from 23 to 28 kilocycles as the subcarrier passes through the various units of the system, including amplifier 24, band-pass filter 25, mixer 14, and the main modulator 15 of the radio transmitter 17. All of these units are of coordinated design in order that the FS subcarrier may pass through them without frequency discrimination as the carrier swings between 23 kilocycles (white) to 28 kilocycles (black). In this manner, by maintenance of uniform frequency-response within the FS subcarrier range between 23 and 28 kilocycles throughout the subcarrier channel from the source (multivibrator 23) to and including the modulator 15, a multiplex subcarrier signal of constant amplitude is retained, without the injection of the amplitude modulation of the FS subcarrier which would result if the over-all frequency response of the chain of subcarrier units were not substantially uniform. Inasmuch as tests have demonstrated that any substantial amplitude modulation of the FS subcarrier will increase the possibility of unwanted audible discernment of the multiplex signal at FM broadcast receiving points, particularly if the broadcast receiver is not properly aligned or if the discriminator is not properly balanced. With a constant-amplitude subcarrier, no audible signal has been detected at any type of FM broadcast receiver, even though not properly tuned or adjusted, under any condition of operation. Further, the level of the FS subcarrier may be raised substantially beyond normal 5–10% to effect approximately 20–30% modulation of the main carrier by the subcarrier without intruding into the aural program range at FM broadcast receiving points. Were amplitude modulation of the subcarrier present, these relatively high-level subcarrier signals would, in some instances, "break-through" into the audio system of improperly adjusted FM receivers.

The maintenance of constant-amplitude of the FS subcarrier is also of important from the viewpoint of radio-relay operation, especially in FM broadcast networks where the main aural program and the facsimile subcarrier may be relayed from station to station throughout the length of the network chain. With a constant-amplitude subcarrier, monitoring and level-adjusting procedures are readily handled by relay station operating personnel with a minimum of attention, whereas the presence of any significant amount of amplitude modulation will render more difficult the relay function and may introduce distortion in the relay process. As will be explained in detail in subsequent paragraphs, it is possible and desirable with the system of the invention to enable radio-relay transmission on a multiplex basis without detection or demodulation of the subcarrier at the relay stations, thus preventing the accumulation of additional distortion at each relay point that may occur whenever a received signal is demodulated, re-amplified and then re-transmitted. With such "straight-through" relay transmission of the multiplex subcarrier (that is, without demodulation of the subcarrier at the radio relay station) it is particularly important that no substantial amount of amplitude modulation of the FS subcarrier be present; otherwise distortion may be caused. It is essential, therefore, that no significant amount of amplitude modulation of the FS subcarrier be introduced at the initial FM broadcast station of a radio-relay chain.

Figure 2:
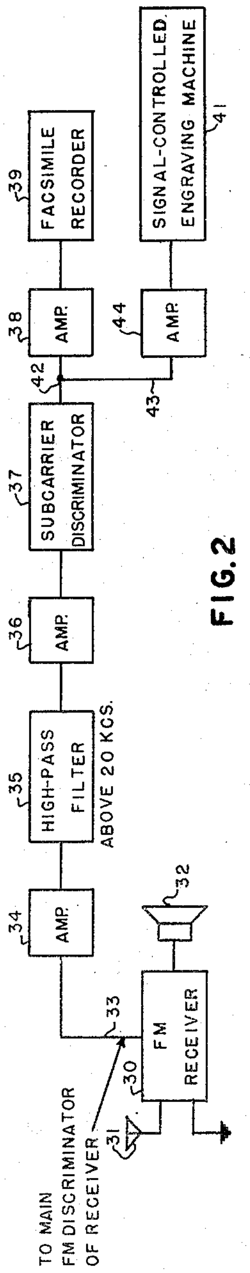
Fig. 2 is a block diagram of an illustrative arrangement of equipment at a radio receiving point, showing the means employed for simultaneous reception of (1) high-fidelity aural programs as transmitted by an FM broadcast station and (2) facsimile signals as transmitted by the multiplex system of the invention.
Figure 3:
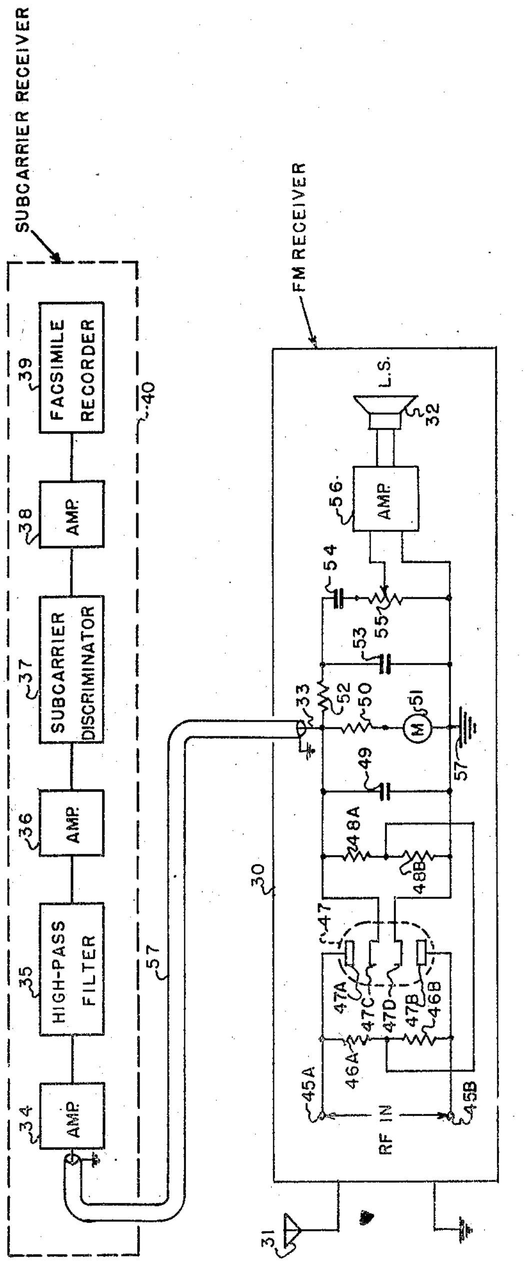
Fig. 3 is a combined schematic diagram and block diagram of the facsimile multiplex equipment employed in the illustrative receiving arrangement of the invention showing details of interconnection between an FM broadcast receiver and the multiplex receiving equipment of the invention to permit simultaneous non-interfering reception of aural programs and facsimile signals.

In the illustrative arrangement of facsimile multiplex receiving equipment, shown in Figs. 2 and 3, a standard FM receiver 30, with antenna 31, is used to receive the broadcast aural program signals from a transmitter such as 17, Fig. 1, and the inaudible facsimile multiplex subcarrier. As shown in Fig. 2, a loud speaker 32 is used in conventional and well-known manner to cause acoustic reproduction of the aural program signals within the range 30–15,000 cycles. The inaudible FS subcarrier is applied to the signal input of amplifier 34 by means of conductor 33 connected with the main channel discriminator output circuit of the receiver, as shown in detail in Fig. 3 and as will be described in subsequent paragraphs.

The FS subcarrier signal is then applied to high-pass filter 35 which passes without attenuation and without frequency discrimination the 23–28 kc. FS subcarrier signal. Aural program signals within the audio range to 15,000 cycles are prevented from passing through the high-pass filter by virtue of the relatively great attenuation of audio frequency signal energy as compared with the unrestricted passage of the FS subcarrier in the 23–28 kc. range. The subcarrier signals are then applied to amplifier or cathode follower 36, having a flat frequency-response within the range 23–28 kc., after which they are demodulated by subcarrier discriminator 37, which provides in its output circuit a facsimile subcarrier having variations in amplitude corresponding in a relative sense to the amplitude variations of the 10 kc. subcarrier as supplied by the facsimile scanner at the transmitting point. The demodulated subcarrier also retains the variable-frequency characteristics within the range 23–28 kc. as initially provided by the multivibrator 23 at the transmitting station. The demodulated subcarrier is then applied to a recording amplifier 38, having a flat frequency-response characteristic within the range 23–28 kc. in order that the amplitude-variations of the demodulated subcarrier as provided at the output of the subcarrier discriminator 37 will not be altered as the subcarrier swings between 23 and 28 kc. The amplified facsimile subcarrier, varying in amplitude and in frequency is applied to the facsimile recorder 39 of any suitable well known type having a flat recording characteristic with respect to variations in frequency within the range 23–28 kcs. In the recorder, the variations in amplitude of the subcarrier produce the recorded facsimile copy, corresponding in black, white and half-tone reproduction to the original scanned copy at the transmitter.

A facsimile-signal-controlled engraving machine 41, of any suitable type, may be employed at the subcarrier receiving point to produce newspaper cuts as controlled by scanning signals provided by the facsimile scanner 19, Fig. 1, at the central control point. An amplifier 44, similar in general respects to amplifier 38, is used to amplify the facsimile signals for operation of the engraving machine 41. In this manner, news photographs or complete pages may quickly be reproduced by conventional printing press facilities in a number of communities with centralized control at a key city.

In Fig. 3 it will be noted that the interconnection of the FM broadcast receiver 30 and the multiplex subcarrier receiver 40 is by means of shielded conductor 33, disposed in the center of the hollow outer conductor or shield 57, normally connected to ground to minimize the pickup of unwanted signals or noise by the subcarrier receiver 40, as well as to minimize the possibility of introducing noise in the audio system of the FM receiver. It will be noted that the conductor 33 is connected to the output circuit of the FM discriminator tube 47, of any well known type, at a point before the insertion of the de-emphasis network, comprising resistor 52 and condenser 53. The discriminator tube 47, of well known balanced type utilizing a dual diode having anodes **47*a* and 47*b* and cathodes 47*c* and 47*d*, is supplied with FM radio-frequency signal energy in conventional manner by application of signal voltage at points 45*a* and 45*b*. The FM radio signal energy is demodulated in the discriminator including its associated frequency discriminator network, and the audio signals with which the FM carrier is modulated are converted into their original variable amplitude form. Balanced resistors 46*a* and 46*b* are connected between the two anodes 47*a* and 47*b* as shown, with connection of the mid-point of the pair of resistors to the center connection of two balanced load resistors 48*a* and 48*b*, arranged in series between the two cathodes in well known manner as shown. A radio-frequency by-pass condenser 49 is employed in conventional manner across the load resistors, and a tuning meter 51, in series with resistor 50 and ground 57, is used to indicate resonance at the center frequency of the FM broadcast station. A standard 75 micro-second de-emphasis network, consisting of resistor 52 and capacitor 53, is employed across the audio output circuit as shown, with output coupling capacitor 52 and gain control potentiometer 55 being used in series in the output as shown, the potentiometer 55 being used to control the level of audio signals applied to audio amplifier 56, whose output circuit is attached to loud speaker 32** as illustrated.

Figure 4:
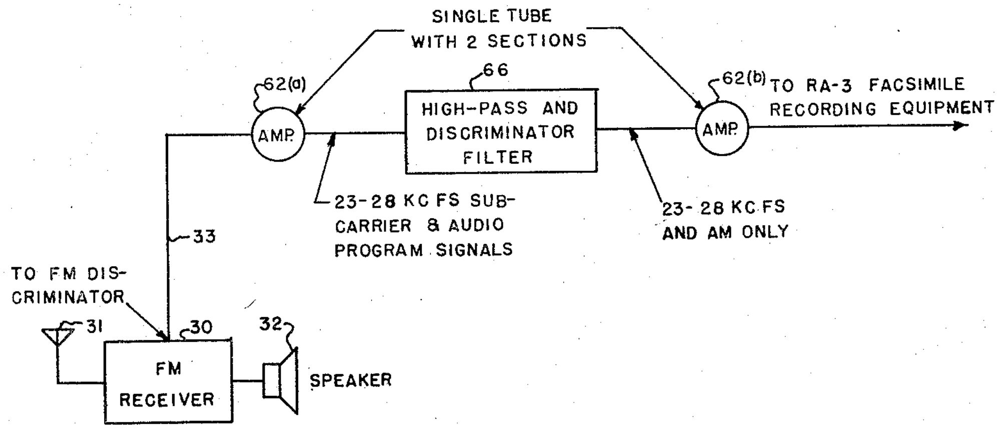
Fig. 4 is a block diagram of a simplified form of facsimile multiplex receiving equipment, attachable to a conventional FM broadcast receiver to permit simultaneous non-interfering reception of high-fidelity aural broadcast programs and facsimile material as transmitted by an FM broadcast station.

The arrangement of Fig. 4 is a simplification of the subcarrier receiving circuits of Fig. 3 in that a single two-section amplifying tube **62*a*—62*b* is employed in combination with a single filter unit 66 to effect (1) uniform amplification of the FS in the range 23–28 kc. subcarrier, (2) separation of the FS subcarrier from the aural program signals in the 30–15,000 cycle audio range, (3) demodulation of the FS subcarrier to provide variations in amplitude of the subcarrier corresponding in general to the original amplitude variations of the 10 kc. facsimile subcarrier, and (4) application of the demodulated subcarrier in the 23–28 kc. range, without frequency discrimination therein to standard facsimile recording equipment. The filter unit 66 is of simple, inexpensive design and is described in detail in following paragraphs of the specification pertaining to Fig. 5. After amplification of the demodulated facsimile subcarrier in the 23–28 kc. range by vacuum tube amplifier 62*b*** the facsimile subcarrier signals are applied to any suitable well-known form of facsimile recorder, such as the Hogan or General Electric type RA-3 facsimile recording equipment (not illustrated).

Figure 5:
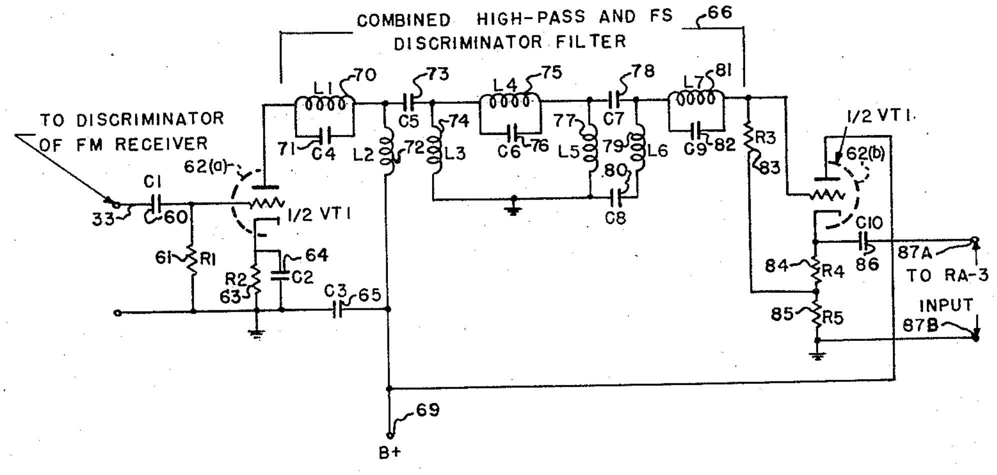
Fig. 5 is a circuit diagram of one form of facsimile multiplex receiving equipment attachable to a standard FM broadcast receiver, shown in the block diagram of Fig. 4.

In the detailed diagram of Fig. 5, corresponding to the arrangement of subcarrier receiving equipment of Fig. 4, conductor 33, connected to the output circuit of the FM discriminator of an FM receiver 30, as shown in Fig. 3, applied the FS subcarrier signals (and audio signals) through coupling capacitor 60 to the control grid of the first vacuum-tube amplifier section **62*a*, with grid resistor 61 connected to ground in conventional manner as shown. The cathode of tube section 62*a* is connected to ground through cathode resistor 63 and cathode by-pass capacitor 64. The plate of tube section 62***a* is connected as shown to a combined high-pass and subcarrier discriminator filter 66.

*Description of filter*

The combined high-pass and FS discriminator filter referred to in Figs. 4 and 5 is a composite filter made up of m-derived half sections for termination and two constant-k and one m-derived full section for the mid-section. The elements 70, 71 and 72 and 79, 81 and 82 comprise the m-derived terminal half sections. Element 80 (cs) is a blocking condenser. Elements 72, 73 and 74; and 77, 78 and 79 are the constant-k sections. Elements 74, 75, 76 and 77 comprise the m-derived mid-section. This filter is designed so that the slope of the cut-off is substantially linear. As the frequency of the subcarrier shifts, the output level varies and so effects a conversion from FS modulation to amplitude modulation. This filter also removes all of the main audio channel signals below 15 kc., due to the high attenuation of the constant-k sections. The demodulated subcarrier signals varying in amplitude within the 23–28 kc. range, are then applied to the control grid of the second vacuum-tube section 62*b*, as shown, this tube section being employed as a cathode follower. The filter unit 66 is properly terminated by load resistor 83, in series with cathode resistor 85 and ground. Cathode resistors 85 and 84 are connected in conventional manner in series between the cathode of tube section 62*b* and ground as shown. Output coupling capacitor 86 is connected between the cathode of tube section 62*b* and the output terminal 87*a* which, as indicated, is connected to one input terminal of any suitable well-known facsimile recording equipment. The ground terminal 87*b* forms the second output terminal to which the facsimile recorder is connected, thus completing the circuit. The circuit of Fig. 5 may be designated as a multiplex adapter unit, inasmuch as it may be attached to standard FM broadcast receivers to adapt them for operation as multiplex receivers. The adapter unit, containing relatively inexpensive parts and a single tube, lends itself to commercial use at low cost and may be sold in quantities for a modest price.

Figure 6:
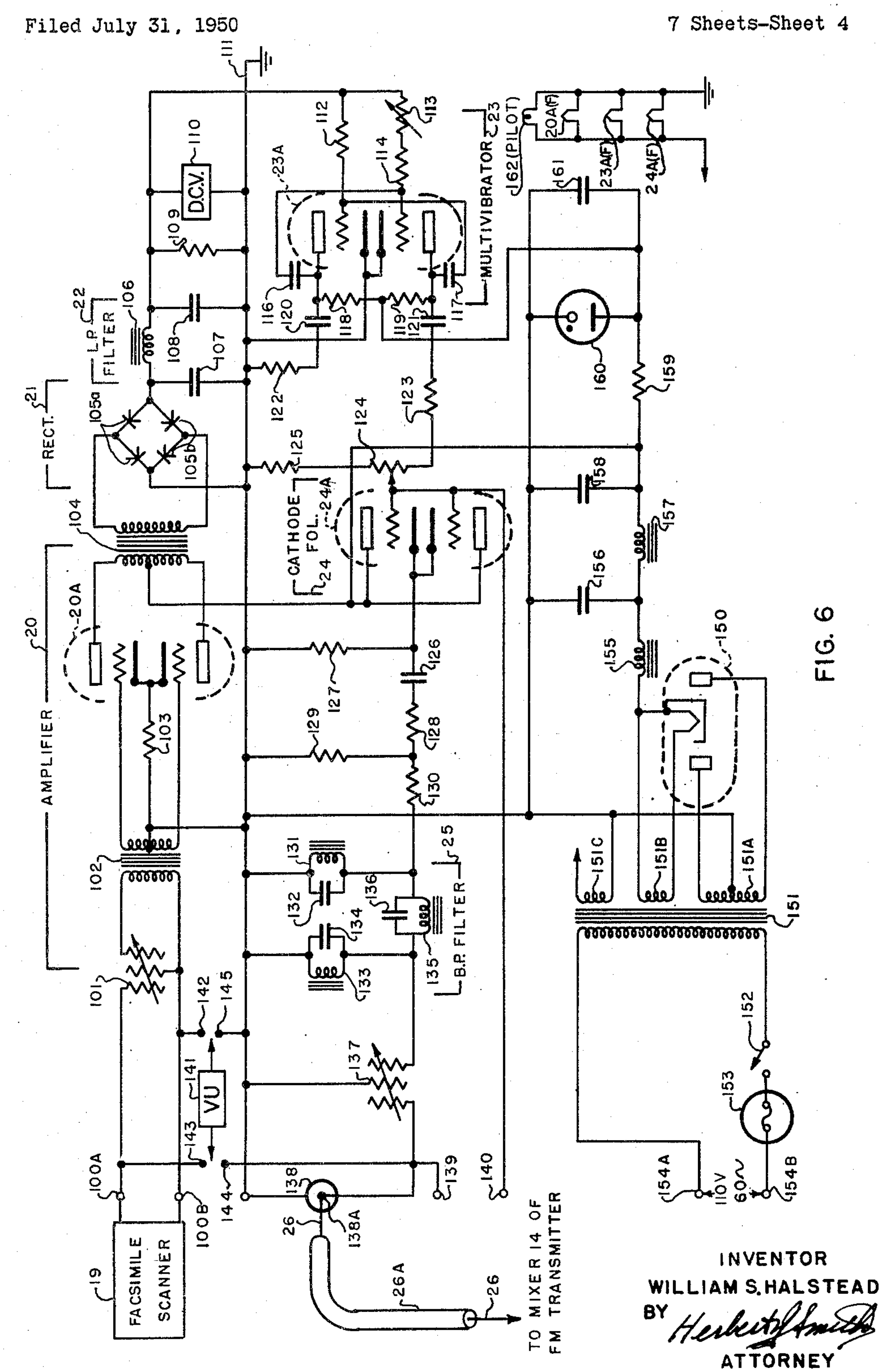
Fig. 6 is a circuit diagram of one form of facsimile multiplex transmitting equipment of the system of the invention.

Circuit details of the facsimile multiplex transmitting equipment of Fig. 1 are shown in Fig. 6. In the circuit diagram, amplitude-modulated subcarrier signals of constant frequency, such as 10 kc., as supplied by a standard facsimile scanner 19, Figs. 1 and 6, are applied to the input terminals 100*a* and 100*b*, Fig. 6, of the multiplex transmitting equipment of the invention. The 10 kc. AM facsimile subcarrier is controlled in level by a constant-impedance potentiometer 101, after which the subcarrier is applied to the primary of input transformer 102, the secondary of which is connected to the control grids of push-pull amplifier tube 20*a* of amplifier unit 20. The cathodes of the amplifier tube 20*a* are joined together and connected through series cathode resistor 103 to the grounded center tap of the secondary of input transformer 102. Measurement of the level of the 10 kc. signal at the input terminals 100*a* and 100*b* is provided by volume unit (VU) meter 141 when connected to contacts 142 and 143, as shown. The plates of push-pull amplifier tube 20*a* are connected to the primary of plate transformer 104, the primary center tap of which is connected to the positive side of a source of plate potential, provided by the high-voltage secondary winding, 151*a*, of power transformer 151, in conventional connection with the anodes of full-wave rectifier tube 150. The heater of rectifier tube 150 is supplied with electric power by heater winding 151*b* of power transformer 151, and the cathode of the rectifier tube 150 is connected in conventional manner to filter chokes 155 and 157, with filter capacitors 156 and 158 connected between the positive side of the high-voltage supply and ground as shown. A voltage regulator tube 160 and associated capacitor 161 in well-known circuit arrangement are connected across the plate supply source as shown, with series resistor 159 connected in series between the positive side of the plate supply and voltage regulator tube 160. The secondary winding of plate transformer 104 is connected to a full-wave rectifier 21 having rectifier sections 105*a*—105*b*, the output of which is connected as shown to the inductance 106 of low-pass filter 22, and to ground 111. The rectifier 21, as explained in connection with Fig. 1, rectifies the 10 kc. facsimile subcarrier and applies the resultant unidirectional D. C. pulses to the low-pass filter 22, comprised of inductance 106 and capacitors 107 and 108, with load resistor 109. The function of the low-pass filter is to remove any residual 10 kc. signal energy or undesired modulating components or harmonics that may be present after rectification of the 10 kc. subcarrier signal. The D. C. voltage provided by signal rectifier 21 may be measured by a D. C. voltmeter 110. The rectified signal voltage is then applied to a multivibrator unit 23, in which a dual-triode tube 23*a* is used. D. C. signal voltage (positive) is applied to one control grid of multivibrator tube 23*a* through series resistor 112, and to the second control grid through series resistors 113 and 114, the former being variable for control purposes. The second grid, to which series resistor 114 is connected, is coupled through capacitor 116 to the plate of tube 23*a* associated with the first mentioned control as shown, and the latter grid is coupled through capacitor 117 to the plate associated with said second control grid, as illustrated. Plate potential is supplied by connection with the positive side of the voltage-regulated power source as shown, through series plate resistors 118 and 119. The multivibrator, in well known manner, provides a substantially constant output voltage at a frequency determined by the time constant of the RC coupling network, consisting of resistors 112 and 114 and capacitors 116 and 117. The D. C. voltage applied at the control grids varies this frequency in a linear manner. Thus, minimum input voltage corresponding to the original facsimile "white" signal will produce a subcarrier frequency of 23 kc., for example, and maximum input voltage, corresponding to the original "black" signal will produce a subcarrier frequency of 28 kc., as an example. Intermediate signal voltages, corresponding to half-tone values, will produce intermediate subcarrier frequencies with linear frequency response characterisics and substantially constant amplitude of the variable frequency or "frequency-shift" (FS) subcarrier signal being obtained. It is pointed out that in this form of circuit, the "idle" or unmodulated carrier position is at minimum frequency, and not at a center frequency, as in other forms of frequency modulation. Thus, in facsimile transmission, the FS subcarrier will vary in frequency over the range between 23 and 28 kc., returning when not modulated, to the 23 kc. minimum frequency. This frequency shift on only one side of the normal or "idle" subcarrier frequency provides appreciable economy in the width of the frequency band utilized.

The FS subcarrier signal energy is applied through coupling capacitor 121 and series limiting resistor 123 to gain-control potentiometer 124, and then to the parallel-connected control grid of cathode follower 24, vacuum tube 24*a*. The return circuit between potentiometer 124 and multivibrator tube 23*a* is completed through series resistor 125 to ground, and through coupling capacitor 120 and series resistor 122 to ground, as shown. The plates of cathode follower tube 24*a* are connected in parallel to the positive side of the plate potential source at the output side of filter choke 157, as shown. The cathodes of tube 24*a* are joined in parallel, and connected to coupling condenser 126, with load resistor 127 connected between the cathodes and ground 111 as shown. A T-pad consisting of resistors 128, 130 and 129 connected between the output coupling capacitor 126 and the input of band-pass filter 25, in which three filter sections comprise (1) series inductance 135 and its tuning capacitor 136; (2) parallel inductance 131 and its tuning capacitor 132; and (3) parallel inductance 133, with its tuning capacitor 134. This filter is designed in accordance with well-known practice to have a substantially flat pass-band response between 23 and 28 kc., with attenuation at frequencies above and below this band (refer to the curve of Fig. 12), thereby eliminating harmonics and undesired modulating components outside of the pass band. A constant-impedance T-pad potentiometer 137 is connected across the output circuit of the band-pass filter, with the output circuit terminating at a coaxial connector 138, of any standard well-known form with central conductor 138*a*. Provision is made for connection of volume unit (VU) meter 141 in order that it may be switched, as indicated from contacts 142—143 to output contacts 144—145, the latter being connected across the coaxial connector 138.

A shielded conductor 26, with shield **26*a*, is used in conjunction with coaxial connector 138 as indicated, with the shield 26*a* being connected to ground as shown in Fig. 1. The coaxial conductor 26** is connected to the mixer of a standard radio broadcast FM transmitter as illustrated in Fig. 1. Since the apparatus above described with reference to Fig. 6 can conveniently be assembled as a unit, such unit can thus be rapidly connected to an existing FM transmitter substantially without interruption (if need be) of its normal transmission, thereby adapting the FM transmitter to multiplex facsimile transmission.

Provision is made at terminal 140 connected to the grids of tube **24*a* for connection of the high-impedance input of a standard oscilloscope (not shown) for monitoring purposes. A direct-reading frequency meter, not shown, may be connected to output terminal 139 and ground. The power transformer 151 is connected to a 115-volt 50/60 cycle source at terminals 154*a* and 154*b*, with fuse 153 and switch 152 being incorporated in series with the primary winding of transformer 151 as shown. Filament winding 151*c* of power transformer 151 is connected to the heaters of the various vacuum tubes in parallel, to which reference has been made in the preceding paragraphs, the heaters of the respective tubes being designated as 20*a* (F), 23*a* (F), and 24*a* (F) with pilot lamp 162** also being connected in parallel, as shown.

It is pointed out that adjustment of attenuator 101 establishes the proper level of audio signals applied to the amplifier 20, rectifier 21 and multivibrator unit 23 and prevents excessive subcarrier frequency deviation. Attenuator 137 in the output circuit of the subcarrier equipment establishes a fixed subcarrier signal level. This attenuator 137, in association with the VU meter 141, is carefully adjusted by the operator at the station to produce a given maximum modulation of the main carrier by the subcarrier, such as the illustrative modulation depth of 5–10%. The establishment of a modulation depth of the main carrier by the subcarrier in this manner is important in the operation of the system as this adjustment determines the reference base against which to gauge the permissible modulation depth of the main carrier by the normal broadcast program signals in the frequency range 50–15,000 cycles. These audio program signals are controlled in amplitude as above explained by conventional gain controls of program amplifiers, such as 11, Fig. 1, which form a part of standard broadcast apparatus. By use of a fixed level for the subcarrier, it is easy for the operator of the broadcast station to control the amplitude of the aural program signals such that the 100% modulation limit established by the Federal Communications Commission is not exceeded.

In the multiplex relay and monitor amplifier of Fig. 7, the frequency-shift subcarrier signals above 20 kc. as well as the audio-frequency program signals are applied to amplifier input terminal **200*a* by connection with the output of FM discriminator tube 47 as shown in Fig. 3. The second input terminal 200*b* is connected to ground 240, as shown. The FS subcarrier signals (as well as the audio-frequency program signals) pass through coupling capacitor 201 and volume control potentiometer 202 to the control grids (parallel-connected) of cathode follower or amplifier 34 of vacuum tube 34*a*. The cathode output circuit is connected from the paralleled cathodes of tube 34*a* through coupling capacitor 203 and series matching resistor 204 to the high-pass filter 35, of conventional design. Cathode load resistor 205 is connected between the cathodes and ground 240 as shown. The high-pass filter is designed, in accordance with well-known engineering practice to provide an over-all response characteristic similar to that of curve 300, Fig. 8, effecting very substantial attenuation of the aural program signals in the audio range below about 18 kc. as compared with the relatively unattenuated and flat response within the range between 23 and 28 kc. The high-pass filter comprises several sections, including inductor 206-capacitor 297; capacitor 208-inductors 209 and 210; inductor 211 and capacitor 212; capacitor 213-inductors 214 and 215; and inductor 216-capacitor 217 connected in conventional design to provide the desired high-pass characteristic of curve 300, Fig. 8. The output circuit of the high-pass filter 35 includes potentiometers 218 and 219, each having a connection with ground 240 as shown, with the arm of potentiometer 219 being connected to the control grid of one section of dual-triode vacuum tube amplifier tube 36*a*, in amplifier 36, and the arm of potentiometer 218 being connected to the control grid of the second section of dual-triode 36*a* as shown. The plates of tube 36*a* are connected through coupling capacitors 221 and 224 in well-known manner, to the control grids of dual-triode tube 36*b*, employed as cathode follower. Grid resistors 227 and 228 are connected as shown between the two control grids and ground, in conventional manner. Positive D. C. plate potential is applied to the plates of cathode follower tube 36*b* by connection with a source of plate potential, at the output of the plate power supply circuit in which full wave rectifier tube 275 is employed in conventional manner, with anodes connected to the high-voltage winding 276*a* of power transformer 276 and with the filament connected to winding 276*b* of power transformer 276. Filter chokes 281 and 282, and filter condensers 280, 283 and 284 are employed in well-known filter connection as shown, with chokes 281 and 282 and series resistor 285 being inserted in the positive side of the D. C. plate-power circuit as illustrated. Voltage regulator tubes 288 and 289 are connected in series-parallel connection across the plate-power supply circuit, as shown, with capacitor 286 connected in parallel across the plate-power circuit. A bleeder resistor 287*a* and 287*b* is connected across the voltage-regulated power output circuit with center connection of resistors 287*a* and 287*b* being joined to the center series connection between the two voltage regulator tubes 288 and 289. Plate voltage to the anodes of amplifier tube 36*a* is supplied by application of plate potential through series resistors 222 and 220 to one anode, and through series resistors 223*a* and 223 to the other anode, as shown, while plate voltage is supplied to the anodes of tube 34*a* by direct connection with the positive side of the plate power supply at the junction of resistors 285 and 287*a***.

The cathodes of tube **36*b* are returned to ground through load resistors 232 and 233; one cathode is coupled to output transformer 235 through capacitor 234. The transformer secondary is loaded with an anti-reflection pad comprised of resistors 236*a*, 236*b* and 236*c*, which is in turn connected to the high-pass output terminals 237*a* and 237*b*** employed for relay purposes.

The other cathode of tube **36*b* is coupled to the discriminator filter 37 through capacitor 231. This filter, which is of the m-derived type, is comprised of inductors 250, 252 and 254 and capacitors 251, 253 and 255. This filter is of narrow band-pass type, having its peak of infinite attenuation on the low frequency side, as shown by the curve 301, Fig. 9. This enables the filter to be designed with a substantially linear slope, as shown as 301, Fig. 9, for the lower cutoff curve. Since the lower cutoff frequency is 28 kc., as the frequency of the subcarrier shifts from 23 kc. to 28 kc., the voltage at the output of the filter will vary linearly with frequency. This results in demodulation of the frequency-shift subcarrier with the resultant signal having variations in amplitude. This signal is applied through potentiometer 260 to one grid of the twin triode tube 38*a*. The cathode of this half of the twin triode is returned to ground through 265, which is by-passed by capacitor 266. The plate is connected through load resistor 267 and decoupling resistor 268, which is by-passed by capacitor 270, to the high voltage supply at the junction of resistors 285 and 287*a*. This plate is also coupled through capacitor 261 to the grid of the other half of the twin triode 38*a*. This grid is returned to ground through resistor 262. This triode section is used as a cathode follower, the cathode being returned to ground through the load resistor 269 and the plate being connected directly to the high voltage supply as shown. The output of this cathode follower is coupled through capacitor 263 to output terminal 264*a*. Terminals 264*a* (ground) and 264*b* comprise the subcarrier discriminator output terminals to which any suitable well-known facsimile recorder, such as 39 Fig. 2 or signal-controlled engraver 41** Fig. 2 may be attached.

It should be noted that the FS discriminator filter 37 Fig. 7 described above supplements high-pass filter 35 in increasing the over-all attenuation of the aural program signals below 20 kc., as is shown by the composite curve of Fig. 10 including high-pass filter response curve 300 (as shown in Fig. 8) and FS discriminator response curve 301 (as shown in Fig. 9) combined in the single graph of Fig. 10.

An illustrative arrangement of the system of the invention for radio-relay operation at an intermediate relay station in an FM broadcast network, for example, is set forth in Fig. 11, wherein frequency-modulated radio signals from a remote radio transmitter, such as 17 Fig. 1, are picked up by antenna 311, preferably of unidirectional type with orientation in the direction of the remote transmitter. The radio signals are than applied to FM receiver 310, having two output circuits. One output circuit provides the aural program signals within the audio frequency range, applying the aural program signals to monitor speaker 313 and low-pass filter 314, which passes the audio signals to audio amplifier 315 and thence to pre-emphasis network 316 after which the audio signals are applied to mixer 317. A similar mixer 14 was previously described in connection with Fig. 1. From the mixer, the audio signals are impressed on the input of modulator 318 of relay transmitter 320 with the resultant frequency-modulated radio carrier energy being amplified by power amplifier 319 of relay transmitter 320, and radiated by antenna 321 usually at a carrier frequency different from that of the originating transmitter 17, Fig. 1.

The second output circuit of the FM receiver 310 is through connector 312 which connects the output of the FM discriminator in receiver 310, as described heretofore, to the amplifier or cathode follower 325, having a uniform frequency response throughout the 23–28 kc. (in the illustrative example) subcarrier range, thus permitting the inaudible FS subcarrier signals to be applied to high-pass filter 326, which effectively removes the aural program signals in the audio frequency range but allows the FS subcarrier to pass without frequency discrimination. The FS subcarrier signals are then applied to amplifier or cathode follower 327, also with uniform frequency response between 23–28 kc., in the illustrative example, after which the FS subcarrier is passed through the band-pass filter 328, having a representative pass-response characteristic as shown at 335, Fig. 12, to attenuate undesired signal energy or noise not in the pass band, after which the FS subcarrier, in its original form as provided at the output of the FM discriminator, is amplified and impressed on the mixer 317, which applies both the aural program signals and the FS subcarrier to the modulator 318 of the relay transmitter 320. As explained hertofore, the amplifier 329 has a substantially flat frequency response over the illustrative subcarrier range, 23–28 kc., and thus produces no amplitude variations as the subcarrier frequency is varied throughout its operating range. To provide a "drop" or monitor circuit at the relay station, conductor 332 is connected to the output of high pass filter 326, as shown, permitting the constant amplitude FS subcarrier as passed by filter 326, to be applied to amplifier or cathode follower 331, having a flat response characteristic between 23–28 kc. in this example, after which the FS subcarrier signal is applied to subcarrier discriminator 333, shown in detail at 37, Fig. 7. The resulting subcarrier, with variations in amplitude, is then used to operate the facsimile recorder 334, which may be employed for monitoring or operational purposes at the relay station.

In the above arrangement of the invention of the system, it will be noted that the inaudible FS subcarrier signal is received and retransmitted without demodulation of the original FS subcarrier envelope, and that the constant amplitude characteristic of the FS subcarrier is retained throughout the relay process, thereby facilitating monitoring and level-control adjustments in the relay channel and minimizing distortion in the relay process.

It is to be understood that the illustrative system of the invention is especially applicable to facsimile, teleprinter or signal-controlled engraving processes, but no limitation to these processes is intended. It is to be understood that the various units in the system may be designated by various phrases or descriptive words such as "FS adapter unit" or "subcarrier receiver" for the portions of the subcarrier circuit shown in block 40, Fig. 3, for example, and the FS descriminator unit 37, Fig. 3, may be designated as a "signal translator" or "subcarrier converter," both terms being employed to convey the idea that one type of subcarrier signal (constant amplitude) is converted into a second type (variable amplitude). The same terms may be used to designate the subcarrier transmitting unit, such as the multivibrator 23, which accomplishes conversion of the variable amplitude, constant frequency subcarrier signal into the constant amplitude, variable frequency, or "frequency-shift" subcarrier signal employed in the system of the invention. Therefore, the unit designated as the multivibrator can be any suitable means for translating the rectified and filtered amplitude-modulated signals into constant amplitude frequency modulated signals beyond the range of audibility.

During actual tests on the circuits of an existing network, the inaudible facsimile subcarrier signals were superimposed on many of the network's regular aural program transmissions with no difficulty of any nature and without causing impairment of high fidelity aural program signals up to 15,000 cycles. These programs included production in which the full range of audio frequencies was transmitted. The network programs, with superimposed facsimile subcarrier, were relayed through stations of the network and the facsimile signals as received were recorded in satisfactory manner without knowledge on the part of the operators or other network stations that the facsimile multiplex tests were being conducted. Throughout the tests, the multiplex signals were passed through the regular station equipment at several of the outlying stations without reports of unusual equipment performance being noted by any of the operating personnel. In test transmissions to date, no report of any audible interference with the aural programs of the network has been received, and, so far as is known, no listener within the total service area of the network has been able to detect any trace of the facsimile subcarrier.

In the tests, no problem has been experienced because of over-modulation, or excessive frequency swing, at any of the network's transmitters. Under normal monitoring procedures, which are unaffected by the operation of the facsimile multiplex system except for a slight reduction in dynamic range, the band width requirements are unchanged.

In tests of the system of the invention, when transmitting facsimile multiplex signals over an FM broadcasting network, the FM transmitter was modulated by the facsimile subcarrier signals to the extent of ten percent, as indicated by the station monitor, with no audio-frequency signal being applied to the transmitter during this period. With a conventional FM broadcast receiver tuned to resonance in the normal manner for reception of FM broadcast signals, no measurable noise in the audio range could be detected above the normal background noise of the receiver, which measured approximately 60 db below a 1-milliwatt reference level on a 600-ohm line at the input terminals of the noise meter. It was estimated that any audible noise from the facsimile subcarrier, if normal background noise of the receiver were substantially reduced, would be approximately 80 db below a reference level of 1-milliwatt on a 600-ohm line. No observable effect such as intermodulation was produced by the subcarrier signal on sinusoidal audio-frequency modulating signals, when applied to the input circuit of the transmitter, as observed with a distortion meter and an oscilloscope.

While the specification refers to the use of the system of the invention in association with FM broadcasting stations, it is obvious that the system is applicable to other types of stations such as those used in mobile communications service.

What is claimed as new and desired to be secured by Letters Patent of the United States is:

1. A facsimile multiplex broadcast transmitter comprising means including facsimile scanning means for producing a first amplitude-modulated subcarrier signal within the audio-frequency range, means for rectifying said first subcarrier signal and for filtering the rectified signal so as to eliminate said first subcarrier and to retain only the modulation components thereof, a multivibrator operable to produce a second subcarrier of normal frequency in the inaudible frequency range, said subcarrier shifting by modulation and on only one side of said normal frequency, means coupling said rectified and filtered first subcarrier to said multi-vibrator to produce a frequency shift in said second subcarrier in accordance with amplitude changes of said first subcarrier signal, said frequency-shift subcarrier being of substantially constant amplitude and having a frequency shift substantially less than the frequency of said second subcarrier, band-pass filter means connected to pass said frequency-shift subcarrier substantially without frequency discrimination in the pass band, a radio broadcast transmitter including means for generating a carrier wave and means for frequency-modulating said carrier wave by said frequency-modulated subcarrier, first means for adjusting the level of the last-named modulation, means for producing audio-frequency program signals, means for frequency-modulating said carrier wave by said audio-frequency program signals, and second means for adjusting the level of the last-named modulation independently of the adjustment by said first means.

2. A facsimile multiplex radio transmitter comprising means including facsimile scanning means for producing amplitude-modulated facsimile signals within the audio-frequency range, means for rectifying said signals and means for filtering the rectified signals to retain substantially only unidirectional signal voltage of amplitudes representative of the scanning, a multivibrator operable to produce a subcarrier of constant amplitude and normal frequency above the range of audibility, means coupling said signal voltage to modulate said multivibrator so as to shift the frequency of said multivibrator on only one side of said normal frequency in response to change in amplitude of said signal voltage, pass-band filter means proportioned to pass substantially only frequencies within the range of said frequency shift, a radio transmitter including means for generating a carrier wave and for frequency-modulating said carrier wave by said frequency-modulated subcarrier and by audio-frequency program signals, and means including said pass-band filter means for coupling the output of said multivibrator to said carrier wave modulating means.

3. A facsimile multiplex radio transmitter comprising means including facsimile scanning means for producing facsimile signals within the audio-frequency range, means rectifying said signals and means for filtering the rectified signals to retain substantially only unidirectional signal voltage of amplitudes representative of the scanning, a multivibrator operable to produce a subcarrier of constant amplitude and normal frequency above the range of audibility, means coupling said signal voltage to modulate said multivibrator so as to shift the frequency of said multivibrator on only one side of said normal frequency in response to change in amplitude of said signal voltage, pass-band filter means proportioned to pass substantially only frequencies within the range of said frequency shift, a radio transmitter including means for generating a carrier wave and for frequency-modulating said carrier wave by said frequency-modulated subcarrier and by audio-frequency program signals, and means including said last-named filter means for coupling the output of said multivibrator to said carrier wave modulating means.

4. A facsimile multiplex radio transmitter comprising means including facsimile scanning means for producing facsimile signals within the audio-frequency range, means for converting and filtering said signals to unidirectional signal voltage of amplitudes representative of the scanning, a multivibrator operable to produce a subcarrier of constant amplitude and normal frequency above the range of audibility, means coupling said signal voltage to modulate said multivibrator so as to shift the frequency of said multivibrator on only one side of said normal frequency in response to change in amplitude of said signal voltage, pass-band filter means proportioned to pass substantially only frequencies within the range of said frequency shift, a radio transmitter including means for generating a carrier wave and for frequency-modulating said carrier wave by said frequency-modulated subcarrier and by audio-frequency program signals, and means including said last-named filter means for coupling the output of said multivibrator to said carrier wave modulating means.

5. A facsimile multiplex radio transmitter comprising means including facsimile scanning means for producing facsimile signals of frequency within the audio-frequency range, means for converting said signals to a filtered unidirectional signal voltage component of amplitudes representative of the scanning, multivibrator subcarrier wave-generating means operable to produce a subcarrier of substantially constant amplitude and of normal frequency above the range of audibility, modulating means connected to said wave-generating means to frequency-shift said subcarrier by said voltage component, said frequency-shift modulating means being operable to shift said subcarrier on only one side of said normal frequency by increase of said voltage component so as to produce a unilateral frequency shift in said subcarrier in accordance with amplitude changes of said signal, and band-pass filter means proportioned to pass substantially only said frequency-shift subcarrier substantially without frequency discrimination in the pass band, a radio transmitter including means for generating a carrier wave, means for producing aural program signals, modulating means for frequency-modulating said carrier wave by said aural program signals, coupling means including a mixer for coupling said modulated subcarrier and said aural program signals to said carrier wave modulating means, said coupling means including said band-pass filter means for coupling the output of said subcarrier-wave-generating means to said mixer.

6. A multiplex radio transmitter which includes a facsimile scanner having an amplitude-modulated carrier output signal of audible frequency, a signal rectifier coupled to the output of said scanner for converting the amplitude modulation component of said carrier to variable amplitude unidirectional pulses, a low-pass filter coupled to the output of said rectifier for separating said pulses from said carrier and undesired modulation components thereof, multivibrator subcarrier wave-generating means of the type which has a normal output in the range of superaudible frequency and substantially constant amplitude and which shifts said frequency on only one side of said normal frequency in response and in proportion to changes in applied unidirectional modulating voltage pulses, means connecting the output of said low-pass filter to said wave-generating means so as to shift the frequency of the subcarrier wave output thereof in proportion to the amplitude of the voltage pulses from said low-pass filter, band-pass filter means coupled to the output of said wave-generating means to pass substantially only said constant amplitude subcarrier, radio transmitter means adapted to generate and modulate a main radio wave, a source of audio-frequency signals, and means for modulating said main radio wave concurrently by said audio-frequency signals and by said constant amplitude subcarrier to effect multiplex modulation of said radio wave with minimized total frequency band width of said main radio wave.

7. Means for adapting for facsimile multiplex operation a frequency-modulation radio transmitter which includes means for generating an FM carrier wave and means for modulating said carrier wave by audio program signals, a source of audio program signals, said first-named means comprising facsimile scanning means and means for producing facsimile signals within the audio-frequency range, means for converting said signal to direct-current pulses of amplitudes representative of the scanning, a multivibrator operable to produce a modulated subcarrier of substantially constant amplitude and of normal frequency above the range of audibility, means coupling said signal voltage to modulate said multivibrator so as to shift the frequency of said multivibrator on only one side of said normal subcarrier frequency in response to change in amplitude of said signal voltage, and coupling means adapted to couple said modulated subcarrier and said audio program signals to the means for modulating said carrier wave.

8. Means for adapting for facsimile multiplex operation a frequency-modulation radio transmitter which includes means for generating an FM carrier wave and means for modulating said carrier wave by audio program signals, a source of audio program signals, said first-named means comprising facsimile scanning means and means for producing therefrom electrical modulating components consisting of filtered direct-current pulses within the audio-frequency range, multivibrator subcarrier wave-generating means operable to produce a normal subcarrier of substantially constant amplitude and of frequency above the range of audibility, modulating means for frequency-shifting said subcarrier by said modulating components over a frequency range extending on only one side of said normal subcarrier frequency so as to produce a frequency shift in said subcarrier in accordance with changes in amplitude of said modulating components, and coupling means adapted to couple said modulated subcarrier and said audio program signals to the means for modulating said carrier wave.

References Cited in the file of this patent

UNITED STATES PATENTS

| Number | Name | Date |
|---|---|---|
| 2,106,806 | Latimer et al. | Feb. 1, 1938 |
| 2,146,301 | Knotts et al. | Feb. 7, 1939 |
| 2,233,183 | Roder | Feb. 25, 1941 |
| 2,250,950 | Goldsmith | July 29, 1941 |
| 2,277,261 | Smith et al. | Mar. 24, 1942 |
| 2,387,098 | Sprague et al. | Oct. 16, 1945 |
| 2,421,727 | Thompson | June 3, 1947 |
| 2,516,009 | Mack et al. | July 18, 1950 |
| 2,545,463 | Hester | Mar. 20, 1951 |
| 2,578,714 | Martin | Dec. 18, 1951 |